(12) United States Patent
Lee et al.

(10) Patent No.: US 7,118,020 B2
(45) Date of Patent: Oct. 10, 2006

(54) STAPLER

(76) Inventors: Chung-Heng Lee, 5F, No. 57, Lane 700, Chung Cheng Road, Hsin Tien City, Taipei 231 (TW); Rebecca A. Nocella, 45 Quartz La., Paterson, NJ (US) 07501

(*) Notice: Subject to any disclaimer, the term of this patent is extended or adjusted under 35 U.S.C. 154(b) by 0 days.

(21) Appl. No.: 11/030,582

(22) Filed: Jan. 5, 2005

(65) Prior Publication Data

US 2006/0144893 A1 Jul. 6, 2006

(51) Int. Cl.
*B25C 1/04* (2006.01)
(52) U.S. Cl. ............ 227/120; 227/151; 227/142; 227/156; 411/457; 411/920
(58) Field of Classification Search .......... 227/120, 227/134, 142, 156, 151; 411/457, 458, 459, 411/920
See application file for complete search history.

(56) References Cited

U.S. PATENT DOCUMENTS

| | | | |
|---|---|---|---|
| 352,000 A | 11/1886 | Penfold | |
| D19,754 S | 4/1890 | Jolley | |
| 1,948,462 A | 2/1934 | Le Page | 24/213 |
| D101,973 S | 11/1936 | Schuster | |
| 2,213,708 A | 9/1940 | Lange | 88/82 |
| 2,239,935 A * | 4/1941 | Scherman | 227/134 |
| 2,242,967 A * | 5/1941 | Carlile | 411/444 |
| 2,329,440 A | 9/1943 | La Place | 227/77 |
| 2,351,043 A * | 6/1944 | Heller | 227/134 |
| 2,358,490 A | 9/1944 | Uribe | 35/39 |
| 2,361,501 A * | 10/1944 | Salzberg | 227/144 |
| 2,702,383 A * | 2/1955 | Buechler | 227/134 |
| D208,816 S | 10/1967 | Simpson | 54/9 |
| D231,902 S | 6/1974 | Olson | 8/8 |
| D236,427 S | 8/1975 | Olson | 8/8 |
| 3,960,307 A * | 6/1976 | Doyel | 227/144 |
| 3,971,969 A * | 7/1976 | Wines et al. | 361/205 |
| 4,163,817 A | 8/1979 | DiCarlantonio et al. | 5/7 |
| 4,187,971 A * | 2/1980 | Prew, Jr. | 227/125 |
| 4,220,070 A | 9/1980 | Anstett | 15/8 |
| 4,592,346 A | 6/1986 | Jurgutis | 2/28 |
| 4,648,531 A * | 3/1987 | Won | 221/232 |
| 4,878,608 A * | 11/1989 | Mitsuhashi | 227/120 |
| 4,927,067 A * | 5/1990 | Leszczak | 227/128 |
| 4,955,813 A | 9/1990 | Fochler | |
| 5,314,427 A | 5/1994 | Goble et al. | 17/56 |

(Continued)

FOREIGN PATENT DOCUMENTS

EP 0605144 7/1994

*Primary Examiner*—Louis K. Huynh
*Assistant Examiner*—Michelle Lopez
(74) *Attorney, Agent, or Firm*—Sofer & Harain, LLP (57) ABSTRACT

A stapler is provided for stapling decorative staples into a sheet media, where the decorative staples have an indicia platform and a plurality of prongs. The stapler includes a base and a cartridge assembly pivotably mounted to the base. The cartridge assembly has a magazine for storing the decorative staples. A stapler head is provided with a ram configured to press downwardly on the indicia platform of the decorative staple, pushing the decorative staple out of the magazine such that the prongs enter a top side of a sheet media and deformed against the base on a bottom side of the sheet media. The ram is provided with ridges that extend below a table portion of the ram such that the ridges are disposed substantially directly above the prongs on the decorative staples.

7 Claims, 7 Drawing Sheets

U.S. PATENT DOCUMENTS

| | | | |
|---|---|---|---|
| 5,414,991 A | 5/1995 | Kfir et al. | 7/2 |
| 5,513,935 A | 5/1996 | Sharber et al. | 15/2 |
| 5,568,785 A | 10/1996 | Hazen | |
| D378,409 S | 3/1997 | Michelson | 24/145 |
| 5,620,289 A | 4/1997 | Curry | 15/8 |
| 5,692,667 A * | 12/1997 | Chi | 227/134 |
| 6,119,998 A | 9/2000 | Anselmo | |
| 6,167,663 B1 | 1/2001 | Nakamoto et al. | 1/60 |
| 6,840,422 B1 * | 1/2005 | Mintzer | 227/109 |
| 2005/0145667 A1 * | 7/2005 | Susson | 227/120 |

* cited by examiner

STAPLER

FIELD OF THE INVENTION

The present invention relates to a stapler. More specifically, the present invention relates to an improved stapler for stapling decorative staples.

BACKGROUND

In the field of fastening devices, staplers are a commonly used device to bind multiple pages of sheet media, such as paper. In addition to staplers being used in office supply situations, they are becoming more prevalent in the craft industry where decorative sheet media are being fastened to one another in an artistic manner.

The office supply versions of staplers can work in this capacity in a utilitarian manner, but they lack the decorative qualities desired in the craft industry. One of the qualities that the craft industry desires is the ability to decorate the face of the staple. Artistic designs or other such information can compliment the art project in which the staples are being used. The narrow utility staples of the office supply industry are insufficient in this respect.

Figures 1A, 1B, 1C:
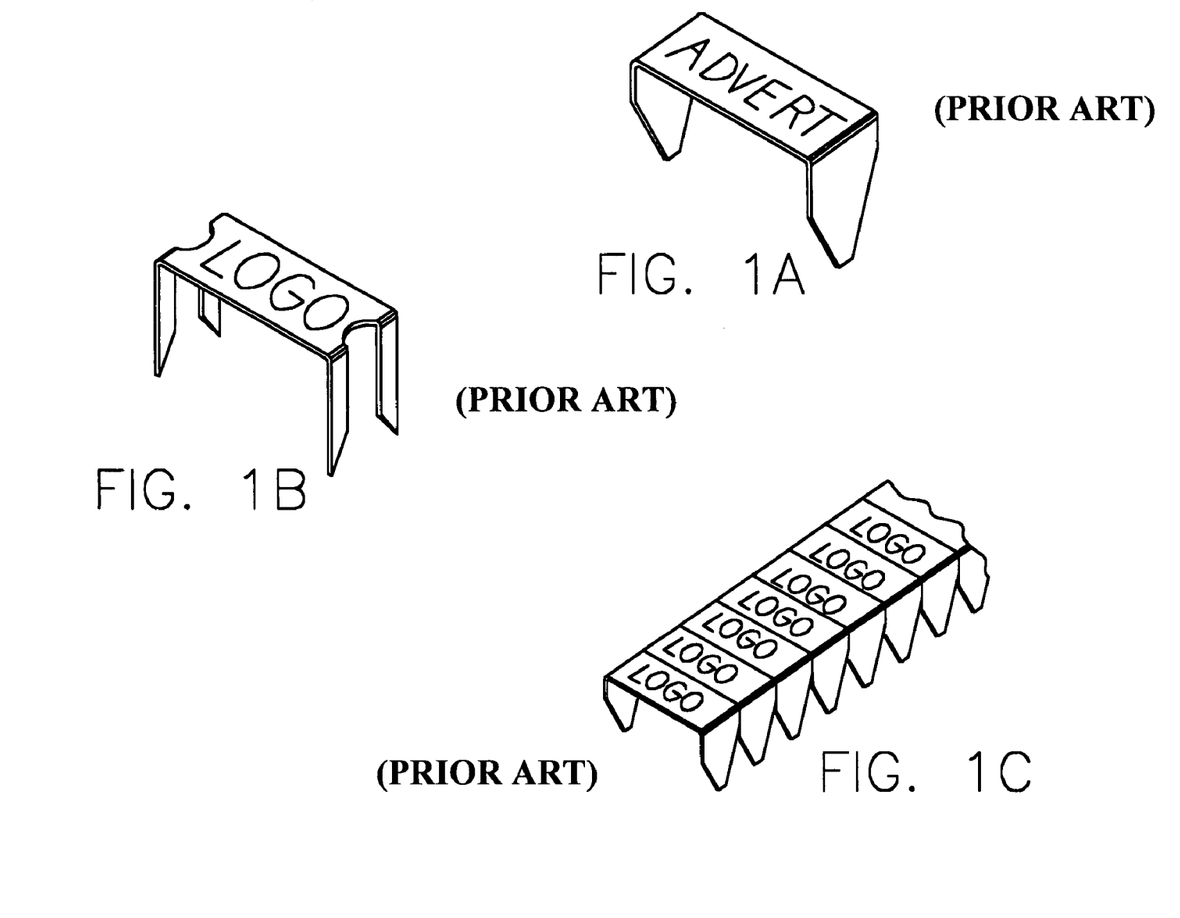
FIGS. 1A–1C show prior art staples that maintain an indicia platform.

As illustrated in FIGS. 1A–1C, U.S. Pat. No. 5,414,991 demonstrates office supply staples that have been created that provide a platform for including company logos and advertisements. These staples use additional prongs above the standard two prong staple in order to provide support for the indicia platform. However, the prior art does not show a means for using such staples in a craft environment. The craft industry requires not only ease of use and cost effective production, but also requires additional features for enhancing staple placement beyond the normal corner insertion used in a standard office setting and also requires that thicker sheet media and larger numbers of sheet media be fastened to one another.

OBJECT AND SUMMARY

The present invention solves the drawbacks of the prior art by providing a combination of decorative staples and an improved stapler useful for the craft industry.

In this respect, it is a first object of the present invention to provide an easy loading and simply constructed stapler for use with decorative staples.

It is another object of the present invention to provide an accurate way to placing decorative staples within the center surface of the desired sheet media.

It is yet another object of the present invention to provide a device for securely placing decorative staples through thicker or multiple sheet media.

As such, the present invention provides for a stapler for stapling decorative staples into a sheet media. The decorative staples have an indicia platform and a plurality of prongs. The stapler maintains a base and a cartridge assembly, pivotably mounted to said base, having a magazine for storing the decorative staples. A stapler head is provided with a ram, configured to press downwardly on the indicia platform of the decorative staple, pushing it out of the magazine such that the prongs enter the top side of the sheet media and deform against the base on the bottom side of the sheet media. The ram is provided with ridges that extend below a table of the ram such that the ridges are disposed substantially directly above the prongs on the decorative staples.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

Figure 2:
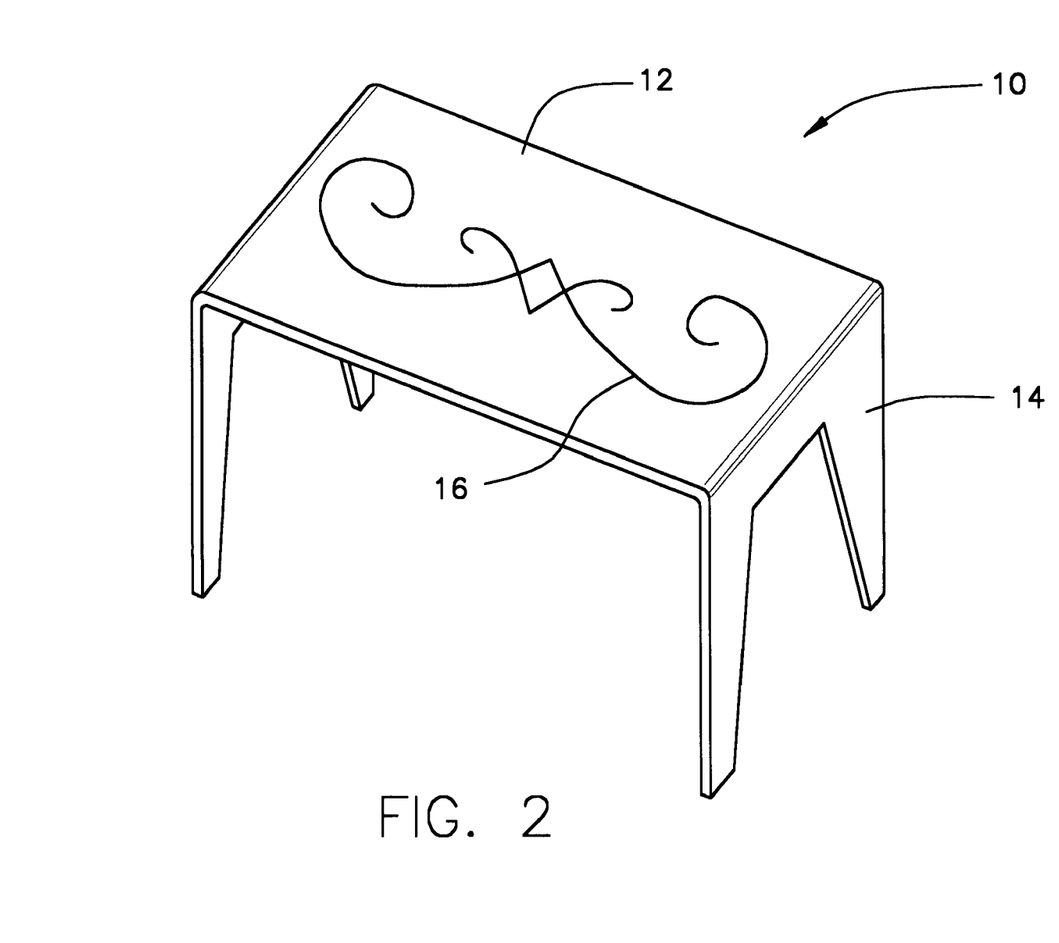
FIG. 2 illustrates a perspective view of a decorative stapler, in accordance with one embodiment of the present invention.

In one embodiment of the present invention, as illustrated in FIG. 2, a decorative staple 10 is shown for use in fastening two or more sheet media to one another. A typical example of two sheet media being fastened together in the craft industry would be to secure a first photograph or image to a piece of craft or construction paper in a scrapbook. Although decorative staple 10 is contemplated for many uses in the craft industry it is not limited in this respect. Any use of decorative staple for fastening two or more sheet media to one another is within the contemplation of the present invention.

Turning to the structure of decorative staple 10, as shown in FIG. 2, staple 10 maintains an indicia platform 12 and four prongs 14. Decorative staple 10 is preferably constructed of metal that is both rigid enough to penetrate the sheet media with which is being used, yet sufficiently deformable so that prongs 14 can be bent on the back side of the sheet media to ensure that the media are secured to one another. The metal used in decorative staple 10 can be the standard steel or aluminum or it can be a colored metal such as brass, bronze, copper or other such metal/alloy to provide more attractive colors.

Indicia platform 12 is shown in a rectangular shape for exemplary purposes but can take any form that is compatible with the stapler in which it is being used. A design 16 is typically placed on the surface of indicia platform 12, although such a design 16 is not required. Design 16 can be made by embossing the metal during printing of decorative staples 10, or, alternatively, design 16 may be printed or etched onto indicia platform 12.

Figure 3:
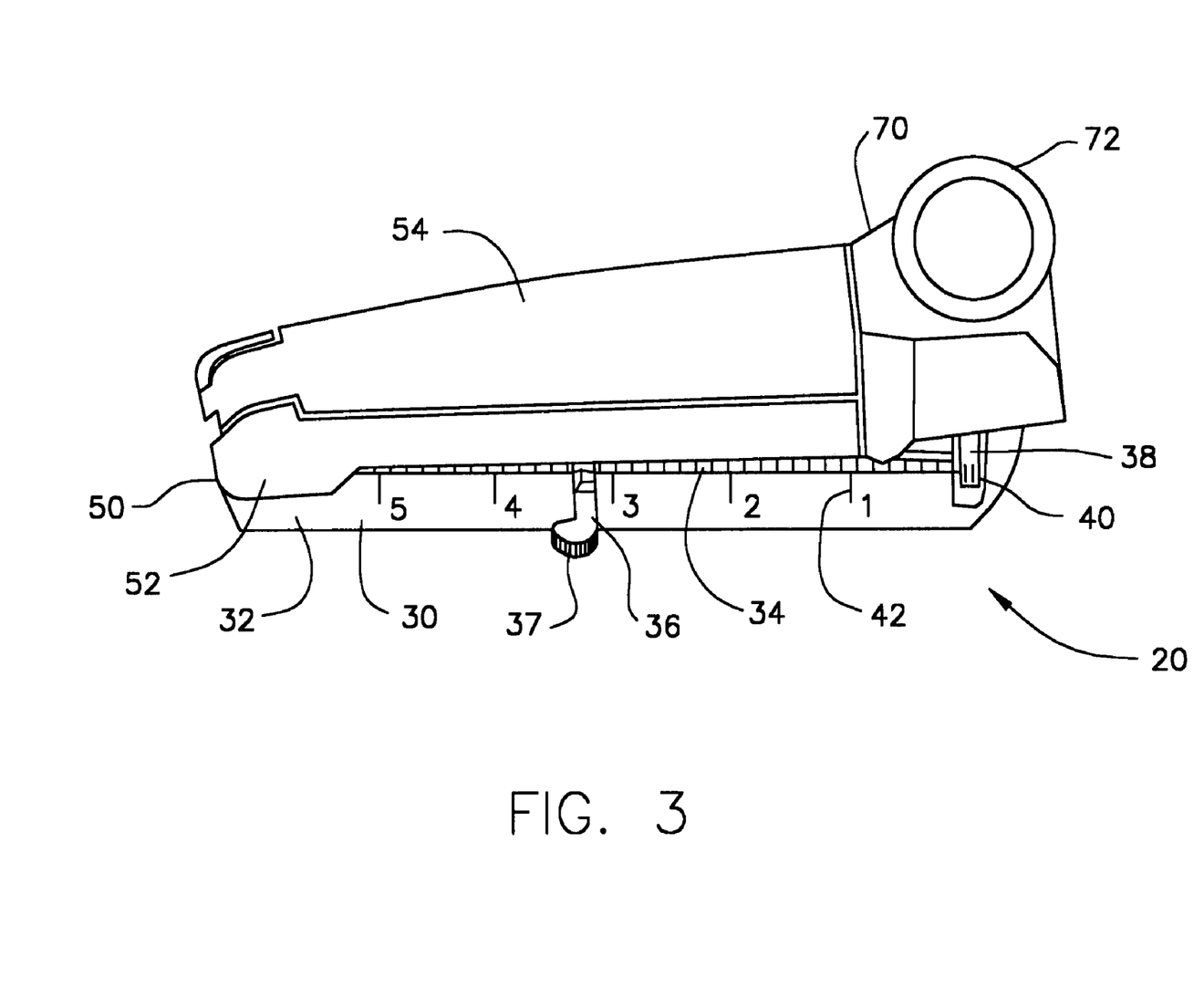
FIG. 3 illustrates an elevated side view of an improved stapler, in accordance with one embodiment of the present invention.

In one embodiment of the present invention, as illustrated in FIG. 3, a stapler 20 is provided for applying decorative staples 10 to the desired sheet media. Stapler 20 may be constructed of either metal of plastic or a combination of both, depending on the desired weight, sturdiness, durability, design and price. Unless stated specifically, the individual components of stapler 20 may be constructed of either material. Also, as noted above, for exemplary purposes, stapler 20 is shown for use with a rectangular staple, such as decorative staple 10, shown in FIG. 2. However, the invention is not limited in this respect. A stapler 20 may be constructed of any dimension so long as it is compatible with the decorative staple to be used therein.

As shown in FIG. 3, stapler 10 maintains a base 30, a cartridge assembly 50, and a stapler head 70. Base 30 maintains a first pivot end 32 for attachment with cartridge assembly 50. Extending from pivot end 32, down the center of base 30, to the front near stapler head 70, is a notched groove 34, configured to support a sheet media alignment stop 36. A user can manipulate sheet media alignment stop 36, using gripping portions 37 and moving it along notched groove 34.

As shown in FIG. 3, base 30 maintains a metal anvil 38 for receiving the prongs 14 from decorative staple 10 and deforming them to secure the sheet media to one another. Anvil 38 maintains dual indentations 40 on both sides, so as to accept the dual prong 14 configuration of decorative staple 14.

Notched groove 36 also maintains graduated depth markings 42 measured from anvil 38 to pivot end 32 of base 30. In this configuration, because pivot end 32 of base 30 is far removed from stapler head 70 of stapler 20, stapler head 70 has a wide range of depths that it can reach within a surface of a sheet media. Using graduated depth markings 42 a user can place decorative staple 10 at a pre-measured depth, well within the surface of the sheet media being fastened, which is particularly useful in the craft and scrapbooking industry.

Figure 4:
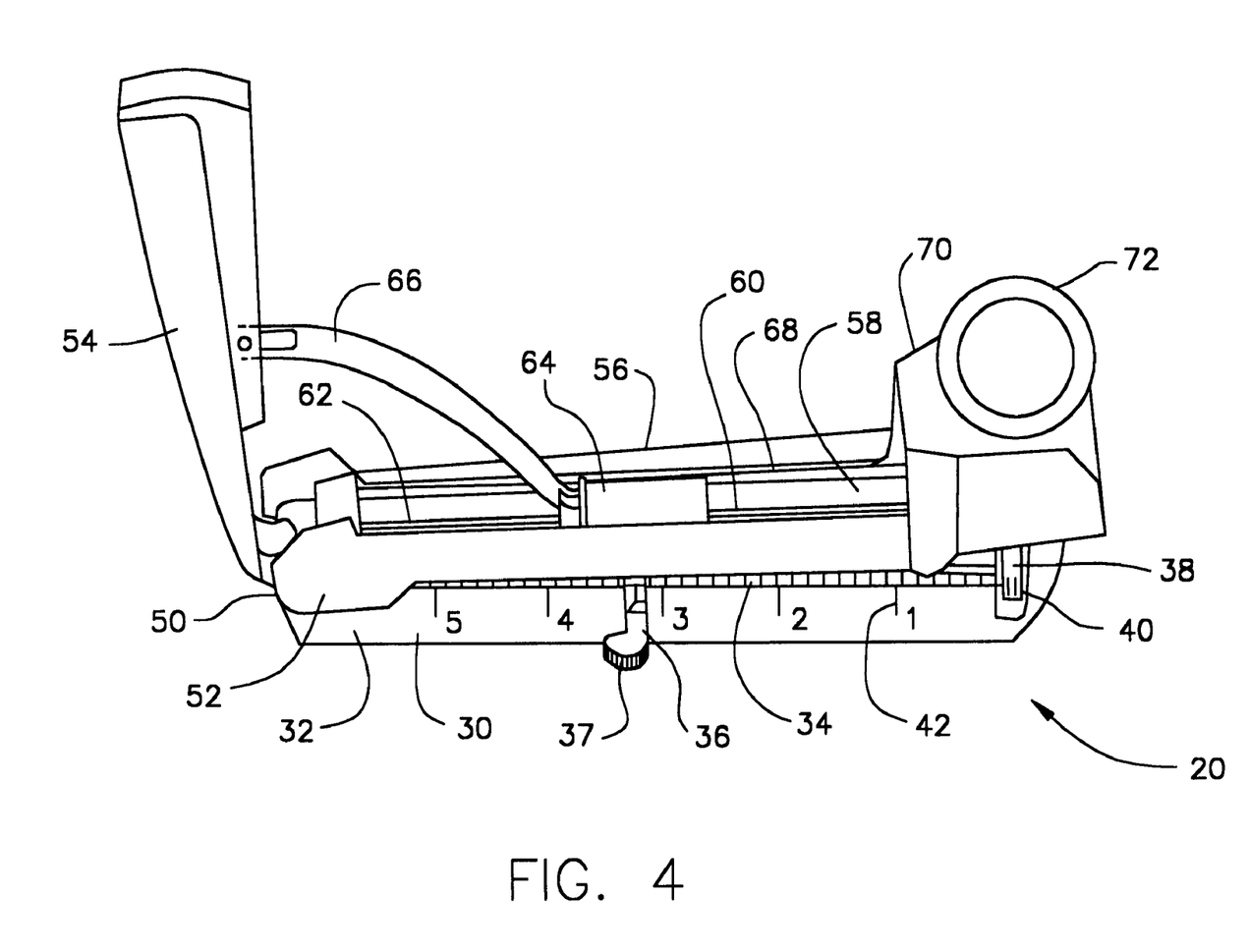
FIG. 4 illustrates an elevated side view of the improved stapler of FIG. 3 with an open staple magazine, in accordance with one embodiment of the present invention.
Figure 5:
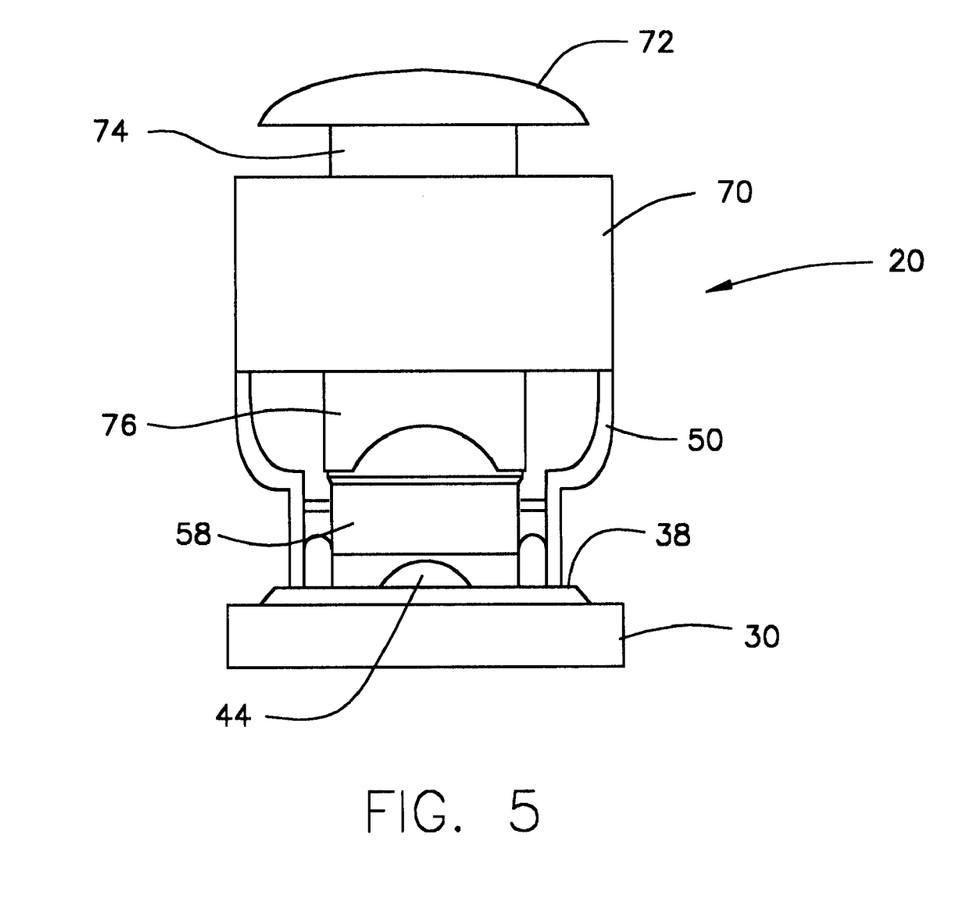
FIG. 5 illustrates a front view of the improved stapler of FIG. 3, in accordance with one embodiment of the present invention.

As illustrated in FIGS. 3 and 4, cartridge assembly 50 is pivotably mounted at a mounting end 52 to pivot end 32 of base 30. Cartridge assembly 50 extends from mounting end 52 towards the front of stapler 20 and terminates at stapler head 70. Cartridge assembly 50 rests on spring loaded stopper 44, illustrated in FIG. 5, near mounting end 52 which acts to keep stapler head 70 biased above metal anvil 38 when stapler 20 is not in use. A magazine cover 54, extending from mounting end 52 to stapler head 70 is pivotably mounted to the top of cartridge assembly 50 to allow a user to easily load and clear decorative staples 10 into/from stapler 20.

As shown in FIG. 4, when magazine cover 54 is pivoted open from mounting end 52, a magazine 56 is exposed. Magazine 56 is principally composed of a metal track 58 fit within cartridge assembly 50. Metal track 58 runs the length of cartridge assembly 50 from mounting end 52 all the way through to the front of attached stapler head 70. Metal track 58 is configured to support a column of interconnected decorative staples 10 to be used with stapler 20.

A metal guide rail 60 runs down the center of metal track 58 starting at the mounting end 52 and terminating just before the front end, within stapler head 70. Metal guide rail 60 is outfitted with a spring 62 beginning at mounting end 52 and terminating into a staple block 64. Spring 62 is configured such that when magazine 56 is closed, staple block 64 mounted on guide rail 60 is biased in a direction towards stapler head 70 so that decorative staples 10 are positioned to be stapled into the desires sheet media.

As illustrated in FIG. 4, when magazine cover 54 is opened, a block retractor 66 is coupled to the under side of cover 54 at one end and is coupled to a retractor track 68 on the side walls of metal track 58 at the other end. When cover 54 is opened, block retractor 66 slides against staple block 64 forcing it back in magazine 56, away from stapler head 70, so that a user can insert or remove decorative staples 10 into/from metal track 58. When magazine cover 54 is closed, block retractor 66 slide forward in retractor track 68 is of length that is no longer exerts a force on staple block 64, allowing spring 60 to bias staple block 64 back towards stapler head 70.

As shown in FIGS. 3 and 4, stapler head 70 maintains a stapling button 72, configured to allow the user to staple decorative staple 10 into the desired sheet media. Stapling button 72 is mounted onto a spring loaded stapling shaft 74 which enters into the top of stapler head 70. Within stapler head 70, a spring acts to keep stapler shaft 74 and stapling button 72 biased in an upward direction when not in use. Extending out of the bottom of stapler head 70 is a track terminus 76 configured to secure the front end of metal track 58.

Figure 6:
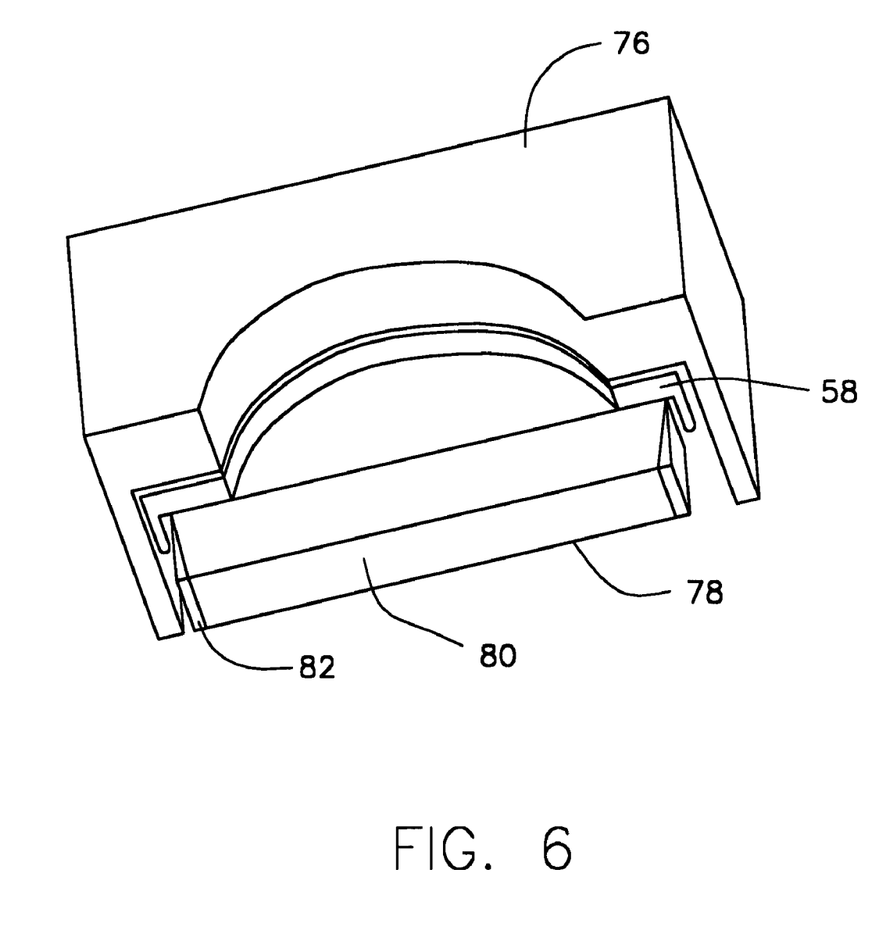
FIG. 6 illustrates a close up underside perspective view of a the improved stapler of FIG. 3 with an extended staple ram, in accordance with one embodiment of the present invention.
Figure 7:
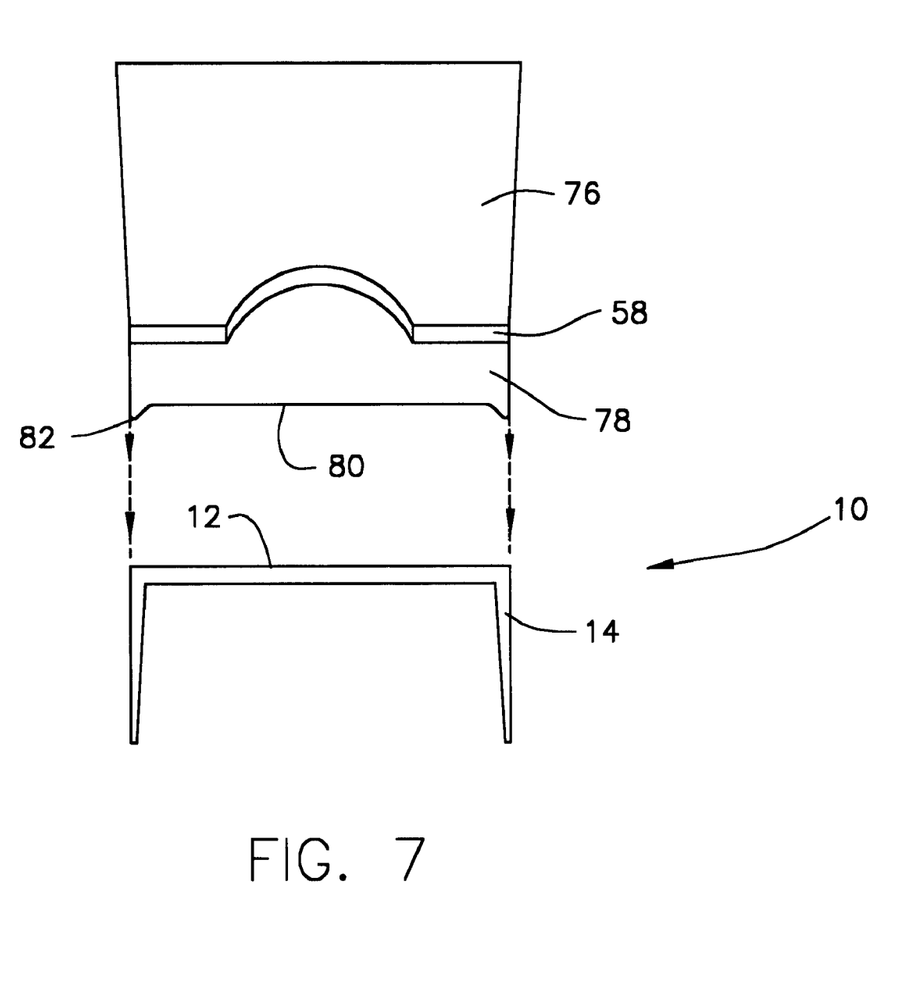
FIG. 7 illustrates a close up front view of the staple ram from FIG. 6, in accordance with one embodiment of the present invention.

Ram 78 is provided with a substantially flat table portion 80 which is substantially the same size and indicia platform 12 of decorative staple 10. In one embodiment of the present invention, as shown in FIGS. 6 and 7, ridges 82 at either end of table portion 80 along the two sides that are axial aligned with the length of stapler. Ridges 82 are configured to press down upon the portions of indicia platform 12 which are directly above the four prongs 14 which provide additional stability to the pressing force, assisting prongs 14 in penetrating the desired sheet media. Because prongs 14 for decorative staples 10 are wider than typical two prong office staples, ridges 82 assist in focusing the pressure over prongs 14. This arrangement allows for a significant number of sheet media or thicker sheet media such as photographs or sturdy craft paper to be fastened to one another using the multi-prong 14 decorative staples 10.

In one embodiment of the present invention, when a user desires to staple decorative staple 10 into a sheet media, a user presses on stapling button 72. As shown in FIG. 6, when stapling button 72 is pressed, stapler shaft 74 is moved downward against the internal spring bias within stapling head 70, forcing a ram 78 downward against the first decorative staple 10 in the front end of metal track 58. It is understood that metal track 58 of magazine 56 has an opening at the stapler head 70 end that is sufficient to allow exactly one decorative staple 10 and ram 78, which are substantially the same size, to pass therethrough.

During stapling, the entire cartridge assembly 50 also lowers against spring loaded stopper 44 on base 30 allowing ram 78 to press decorative staple 10 directly against anvil 38 to that prongs 10 can be sufficiently deformed to bind the sheet media to on another. Once a decorative staple 10 has been punched and the user removed there hand from stapler 20, the entire cartridge assembly is again biased upwards away from base 30 by spring loaded stopper 44. Simultaneously, stapling button 72 is again biased upward, allowing ram 78 to retract out above magazine 56 whereby staple block 64 is biased forward by spring 62 within magazine 56 forcing the next decorative staple 10 into position to be stapled by ram 78.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A stapler for stapling decorative staples into a sheet media, wherein said decorative staples have an indicia platform, at least two left prongs and at least two right prongs located at the corners of the indicia platform, said stapler comprising:
   a base;
   a cartridge assembly pivotably mounted to said base at a pivot end, said cartridge assembly having a magazine for storing said decorative staples; and
   a stapler head, said stapler head having a ram configured to press downwardly on the indicia platform of said decorative staple, pushing said decorative staple out of said magazine such that said two left prongs and said two right prongs enter a top side of a sheet media and are deformed against an anvil in said base on a bottom side of said sheet media, wherein said ram is provided with a substantially rectangular table with left and right elongated ridges that extend below said table of said ram where said left and right ridges are disposed substantially directly above said left and right prongs on said decorative staples, such that when said stapler head is pressed downward, said left and right longitudinal ridges make initial contact with both said left prongs and said both right prongs of said staple to provide equal pressure on all four prongs during insertion through said sheet media.

2. The stapler as claimed in claim 1, wherein said base further maintains a notched groove for supporting a sheet media alignment stop.

3. The stapler as claimed in claim 2, wherein said sheet media alignment stop, maintains gripping portions for moving it along said notched groove.

4. The stapler as claimed in claim 2, wherein said notched groove maintains graduated depth markings measured from said anvil on said base towards said pivot end on said base so that said sheet media alignment stop can be moved along said notched groove to select a pre-measured depth along a surface of said sheet media being fastened, resulting in said staple being applied form an edge of said sheet media at said pre-measured depth along said sheet media surface.

5. The stapler as claimed in claim 1, wherein said magazine further maintains a spring biased staple block configured to force said decorative staples in a direction of said stapler head.

6. The stapler as claimed in claim 5, wherein said magazine further maintains a guide rail configured to slidably secure said staple block within said magazine.

7. The stapler as claimed in claim 5, wherein said magazine further maintains a pivotable magazine cover, said magazine cover having an attached block retractor, said block retractor being coupled to a retractor track in said magazine at an opposite end, such that when said pivotable magazine cover is opened, said block retractor slides along said retractor track and pulls said staple block away from said stapler head.

* * * * *